April 21, 1959  G. KLIESCH  2,883,601
CONSTANT CURRENT CIRCUIT FOR MECHANICAL RECTIFIERS
Filed Feb. 28, 1955

INVENTOR.
GUNTER KLIESCH
BY
Ostrolenk & Faber
ATTORNEYS

United States Patent Office 2,883,601
Patented Apr. 21, 1959

2,883,601

CONSTANT CURRENT CIRCUIT FOR MECHANICAL RECTIFIERS

Günter Kliesch, Erlangen, Germany, assignor to Siemens-Schuckertwerke A.G., Berlin, Germany, a corporation of Germany Application February 28, 1955, Serial No. 491,095

10 Claims. (Cl. 321—48)

My invention relates to a constant output voltage or current circuit for mechanical rectifiers or electromagnetic rectifiers and relates more specifically to a control means for a flux reversal circuit which is responsive to an output parameter and completely eliminates all mechanical elements.

Mechanical rectifiers which utilize flux reversal circuits for magnetic control of the output voltage are shown in co-pending application Serial No. 485,058 filed January 31, 1955. The operation of a mechanical rectifier utilizing flux reversal of the commutating reactor is as follows:

An alternating potential is impressed across a contact and series connected load. This contact is opened and closed in synchronism with the impressed alternating potential. When the alternating potential is in the direction desired for the load potential, the contact is closed and the input alternating potential appears across the load. When the alternating potential subsequently reverses, the contact is opened and the alternating potential then appears across the open contact. Hence, by opening and closing the contacts in synchronism with the input alternating potential, a unidirectional potential can be impressed on the load.

In order to provide a low current step in which the contact can be repeatedly opened and closed, a commutating reactor is placed in series with the contact. Commutating reactors have a core material made of a high permeability material and their construction and operation are clearly described in United States Patent No. 2,693,569 issued to Edward John Diebold on November 2, 1954 and assigned to the assignee of the instant application.

When the commutating reactor is unsaturated, it limits the current through the contact to approximately one thousandth of its peak value. Hence, when the contact is closed to allow the alternating potential to appear across the load, the commutating reactor unsaturates and limits the inrush current to the value of its magnetizing current until the commutating reactor saturates. After the commutating reactor saturates, the current rises to a value given by the impedance of the load and rectifying system. When the alternating potential reverses, the load current decreases to zero current, the commutating reactor unsaturates once again and a low current step is provided in which the contact can be safely opened.

Magnetic voltage control as described in co-pending application Serial No. 423,358 filed April 15, 1954, now Patent No. 2,817,805, can now be incorporated into this circuit. After the contact closes to allow the alternating potential to appear across the load, it falls across the extremely high impedance of the commutating reactor instead. Therefore, the potential which should appear across the load does not appear there until the commutating reactor saturates. It is now obvious that by varying the period of unsaturation of the commutating reactor during the make interval, the voltage appearing across the load is varied. This type voltage control is herein called magnetic control.

The degree of unsaturation of the commutating reactor for magnetic control can be achieved by a predetermined amount of flux reversal of the commutating reactor prior to the time the contact is closed. Hence, if the commutating reactor flux is not reversed prior to contact closure, the alternating potential after contact closure will appear on the commutating reactor until the flux is completely reversed. Therefore, a minimum voltage will appear on the load. If, however, the commutating reactor is completely reversed prior to contact closure, the alternating potential after contact closure will immediately appear across the load. Therefore, a maximum voltage will appear on the load if the commutating reactor flux is completely reversed prior to contact closure.

Thus, it is clear that a circuit controlling the degree of unsaturation of the commutating reactor prior to contact closure effects magnetic voltage control of the rectifier. The above description can be easily extended to include multiple phase systems in which the alternating potential is derived from transformers of various well known connections.

Hence, the output voltage of a mechanical rectifier can be controlled by controlling the number of volt seconds, by the number of volt seconds, I mean the integral of the instantaneous voltage appearing across the commutating reactor times the differential of time, this value determining the degree of unsaturation of the reactor supplied to the commutating reactor for their flux reversal.

Flux reversal circuits have been shown in the past which provide means to maintain a constant output voltage and utilize mechanical elements such as relays, motors and so on to vary the flux reversal current to thereby maintain the output current at a predetermined constant value. Mechanical devices of this type, however, present three disadvantages: the first is that a mechanical link is inserted in a chain of electrical processes which thereby appreciably decreases the response time of the over-all apparatus; secondly, the mechanical elements provide an inaccurate control and are unreliable; third, the use of mechanical elements to vary the flux reversal current usually requires for reasons of economy that only one sensing device is used for all phases of a multiple phase rectifier. This can then lead to the individual phase currents being unbalanced.

The principle of my invention is to provide the load winding of a transducer in series with a flux reversal circuit and then make the volt seconds for flux reversal which are supplied to the commutating reactor a function of the measured output current compared to a predetermined value. I then add a stabilizing system which acts to stabilize the operation of the transductor.

In operation, if the measured current is greater than some predetermined value, the transductor will absorb more volt seconds from the flux reversal circuit and the commutating reactor will receive fewer volt seconds for their flux reversal. The output current will then be changed accordingly to bring the measured current back to its predetermined value. The use of the stabilizing system which could be made a function of the output voltage prevents the system from oscillating back to its initial value.

The advantages of my novel flux reversal control circuit over the prior art methods are as follows:

(1) The elimination of mechanical linkages in the system leads to operation which is determined only by the time constant of the transductor system.

(2) The elimination of mechanical parts and the use of only electrical components leads to a more reliable system in which no parts will be subject to mechanical wear.

(3) Far greater accuracy of a constant output current can be achieved since my novel circuit controls the volt seconds supplied to the commutating reactor whereas the mechanical device used heretofore merely controlled the average current in the flux reversal circuit.

(4) Since the components are small and inexpensive, a complete system can be used for each individual phase to thereby assure the same current through each phase of a multi-phase rectifier.

In the above description, my novel flux reversal control circuit was discussed with reference to mechanical rectifiers. It should, however, be noted that my novel device could be applied to electromagnetic rectifiers in which magnetic voltage control is utilized as well as mechanical rectifiers.

In view of the foregoing remarks, a primary object of my invention is to provide a constant current circuit for mechanical or electromagnetic rectifiers utilizing magnetic voltage control in which only electrical elements are used to the exclusion of mechanical devices.

Another object of my invention is to provide an electrical circuit to control the flux reversal volt seconds supplied to the commutating reactor in a mechanical rectifier in such a way that the output current of the rectifier will be accurately maintained at a predetermined value.

Still another object of my invention is the provision of a constant output current circuit for mechanical rectifiers in which all mechanical and electromechanical parts are eliminated.

A further object of my invention is to provide a constant current output circuit which controls the flux reversal volt seconds supplied to a commutating reactor which is not subject to wear and operates within an extremely short time constant.

Still a further object of my invention is the provision of a constant current output circuit that is small and inexpensive enough to be applied to the individual phases of a mechanical rectifier to thereby balance the individual phase currents.

A still further object of my invention is to maintain a constant current output for mechanical rectifiers by using a transductor to vary the flux reversal volt seconds supplied to the commutating reactor in response to the measured difference between the output current and some predetermined value and having a stabilizing system which can be responsive to the output voltage.

Another object of my invention is to maintain a constant voltage output for mechanical rectifiers by using a transductor to vary the flux reversal volt seconds supplied to the commutating reactor in response to the measured difference between the output voltage and some predetermined value and having a stabilizing system which can be responsive to circuit parameters.

These and other objects of my invention will become apparent from the following description taken in connection with the figures in which.

Figure 1:
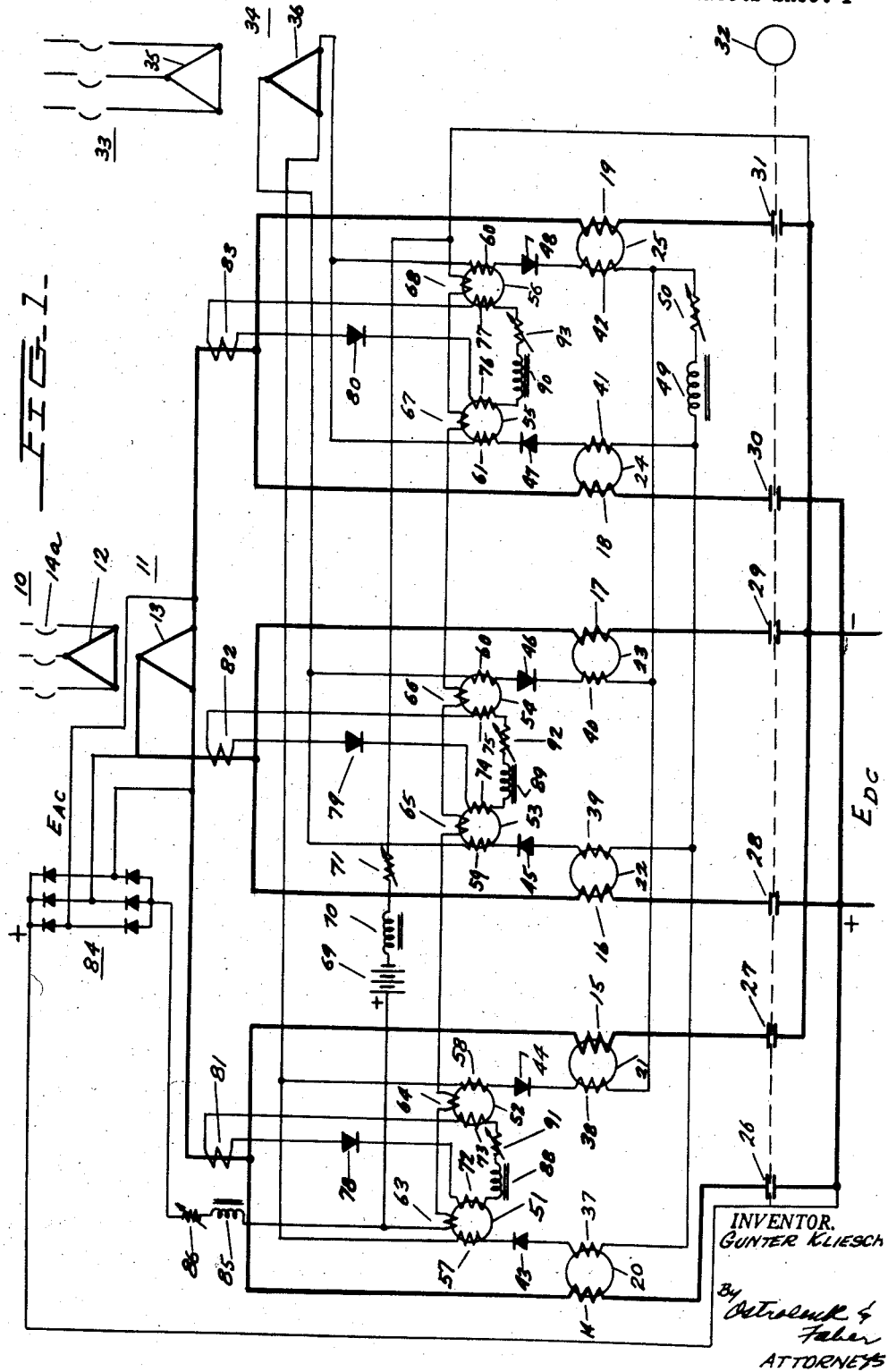
Figure 1 is a schematic diagram showing my invention as applied to a six coil connected mechanical rectifier.

Referring now to Figure 1, the mechanical rectifier proper is shown in heavy lines as being energized from an A.C. line 10, a power transformer 11 having primary windings 12 and secondary windings 13. The secondary windings 13 can be energized by the closing of circuit breakers 14a to subsequently energize commutating reactor main windings 14, 15, 16, 17, 18, and 19 of commutating reactors 20, 21, 22, 23, 24 and 25. In series with each commutating reactor is a mechanically driven contact 26, 27, 28, 29, 30 and 31, respectively. The contacts 26 through 31 are then driven into and out of engagement in synchronism with the voltage appearing on secondary windings 13 by a synchronous motor 32 and a mechanism which is not shown in this application.

Details of the drive motor 32 and contacts 26 through 31 and the operating linkages are clearly shown in co-pending application Serial No. 331,467 filed January 15, 1953, now Patent No. 2,759,141. Contacts 26, 28 and 30 are connected together as shown to form the positive terminal for the output voltage and contacts 27, 29 and 31 are similarly connected to form a negative terminal for the output voltage.

The operation of this main mechanical rectifier circuit can be clearly understood now by reference to the introduction of this application.

Referring again to Figure 1, the flux reversal circuit for control of the saturation of commutating reactors 20 through 25 is energized from A.C. line 33, auxiliary transformer 34 which has primary windings 35 and secondary windings 36. It should be noted that energization of the flux reversal circuit could also be taken from A.C. line 10 and that secondary windings 36 could be placed on the same core of transformer 11. Secondary windings 36 subsequently act to provide a predetermined unidirectional number of volt seconds to each of flux reversal windings 37, 38, 39, 40, 41 and 42 of commutating reactors 20 through 25, respectively.

The unidirectional characteristic of this flux reversal supply is provided by placing rectifiers 43, 44, 45, 46, 47 and 48 in series with each of windings 37 through 42, respectively, and the transformer secondary windings 36. Hence, the flux reversal circuit actually forms a miniature rectifier in which smoothing choke 49 and adjustable resistor 50 act as the load and each phase contains a flux reversal winding 37 through 42, respectively.

The operation of the flux reversal circuit in conjunction with mechanical rectifiers 20 through 25 is clear in that a unidirectional pulse can now be supplied to flux reversal windings 37 through 42 during the time that contacts 26 through 31, respectively, are open in order to presaturate commutating reactors 20 through 25 before their respective contacts 26 through 31 engage.

Hence, by controlling the number of volt seconds supplied to the flux reversal windings 37 through 42, the output voltage is clearly determined since the make step length is determined by the flux reversal.

My novel invention is directed to a circuit in which the volt seconds supplied to commutating reactors 20 through 25 by means of flux reversal windings 37 through 42 is accurately controlled. Furthermore, my novel circuit can be so designed as to maintain a predetermined constant output current as is hereinafter described or to maintain a predetermined constant output voltage.

Figure 2:
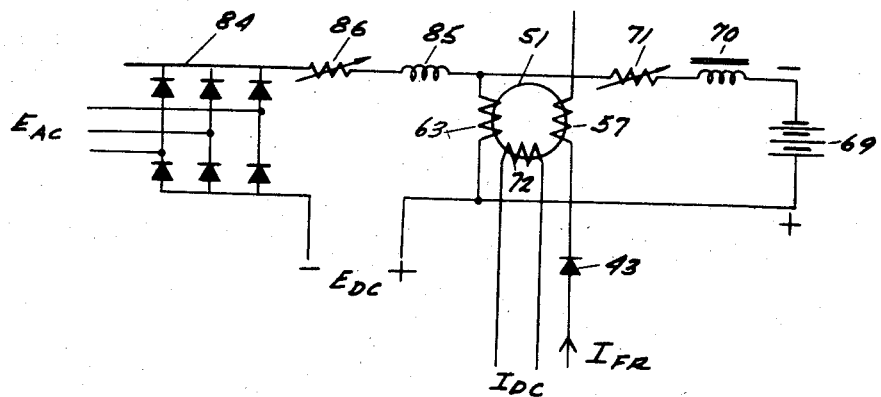
Figure 2 shows the transductor control system of my invention as applied in the circuit of Figure 1.

Referring now to Figures 1 and 2, my novel circuit comprises transductors 51, 52, 53, 54, 55 and 56 which have main windings 57, 58, 59, 60, 61 and 62 which are in series with flux reversal windings 37 through 42, respectively. Biasing windings 63 through 68 are applied to transductors 51 through 56, respectively, and bias the saturation of these transductors in accordance with the value of D.C. source 69. A smoothing choke 70 and variable resistor 71 are then placed in series with D.C. source 69. The adjustment of resistor 71 as will be seen hereinafter will set the desired predetermined value of constant output current.

Transductors 51 through 56 are then provided with further control windings 72, 73, 74, 75, 76 and 77 and these windings are energized through rectifiers 78, 79, and 80 from a source which is responsive to the output current. This signal could be taken from a shunt placed in the D.C. output of a rectifier or as is shown in Figure 1 from current transformers 81, 82, and 83. The signal magnitude can be adjusted in each individual phase by means of inductors 88, 89 and 90 and variable resistors 91, 92 and 93.

A stabilizing system is then provided to prevent oscillation in the output current and comprises in this case a signal which is proportional to the output voltage. This stabilizing system is shown in Figure 1 as being the difference between the A.C. voltage $E_{AC}$ which is rectified at rectifiers 84 and the output voltage shown as $E_{DC}$ and the resultant signal is impressed through a smoothing choke 85 and variable resistor 86 on windings 63 through 68, respectively.

The operation of my novel transductor system in conjunction with the flux reversal circuit of a mechanical rectifier is as follows: Assuming variable resistor 71 has been preset for a desired constant output current, then transductors 51 through 56 have a given amount of saturation and the correct amount of flux reversal is supplied to commutating reactors 20 through 25 by means of flux reversal reactors 37 through 42. If the output current now deviates from this desired value, the signal will be impressed upon transductors 51 through 56 through windings 63 through 68, rectifiers 78, 79 and 80 from the current sensing elements 81, 82 and 83, respectively.

Hence, the degree of saturation 51 through 56 will be changed and a corresponding change in the number of flux reversal volt seconds will be impressed upon flux reversal windings 37 through 42. In view of the varied flux reversal supplied to commutating reactors 20 through 25, the output voltage $E_{DC}$ will change correspondingly. This will in turn change the output current which is then sensed at current transformers 81, 82 and 83 which in turn effect the saturation of transducers 51 through 56.

Accordingly, the flux reversal of commutating reactors 20 through 25 is again varied to vary the output voltage. In response to the changes in output voltage, the follow-up system comprising a difference between the D.C. voltage at the D.C. terminals and the D.C. voltage which is responsive to $E_{AC}$ at rectifiers 84 is applied to windings 63 through 68 of transductors 51 through 56 to prevent the complete system from assuming its previous position and thereby prevent oscillation in the output current. Therefore, the flux reversal conditions of commutating reactors 20 through 25 will be maintained in its corrected position and the output current which is predetermined by adjustment of resistor 71 is maintained constant.

Figure 3:
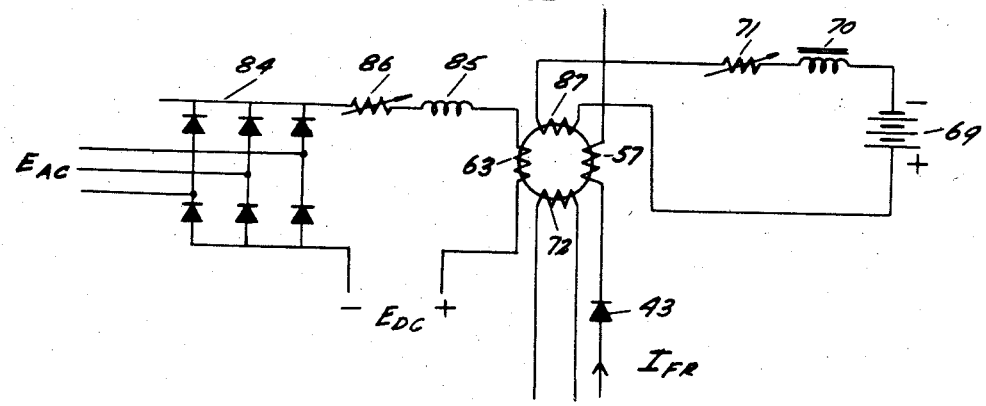
Figure 3 shows a possible modification of the circuit of Figure 2.

Of the many modifications possible in my novel invention, one is shown in Figure 3. Figure 3 is similar to Figure 2 in that it relates to the left-hand phase of Figure 1 which shows the stabilizing system comprising the difference between the $E_{AC}$ and the $E_{DC}$ being impressed as in Figure 1 on the winding 63 but the D.C. bias comprising voltage source 69, choke 70 and variable resistor 71 are shown in this figure as being impressed on the transductor 51 by means of an auxiliary winding 87.

The operation of my novel circuit can now be summarized with reference to Figure 2 as follows:

(1) The desired output current is adjusted by adjusting the saturation of transductor 51 through variable resistor 71 which controls D.C. source 69.

(2) The flux reversal current going to the commutating reactors is controlled by winding 57 which absorbs a controlled part of the input volt seconds.

(3) A deviation from the predetermined output current is reflected in winding 72 which is the saturation of transductor 51.

(4) In view of the changed saturation of transductor 51, winding 57 absorbs a different number of volt seconds supplied from the flux reversal circuit, thereby causing a change in the output voltage which is in a direction to bring the output current back to its predetermined value.

(5) Since the output voltage has changed, the difference between the $E_{AC}$ which is rectified at rectifier 84 and $E_{DC}$ is changed and this change is in such a direction that winding 63 will affect transductor 51 to compensate for the required new value of absorbed volt seconds on winding 57. That is, winding 63 is energized through a stabilizing system. Hence, the output current of the rectifier is maintained at the predetermined constant value.

It should be noted that the system described is completely electrical and uses no mechanical parts which operate slowly, are subject to wear and are relatively expensive.

It should be noted that from the foregoing disclosure, this device could be easily modified to provide a constant voltage output of a predetermined magnitude and that the choice of a description with reference to a constant current output circuit was arbitrary.

Although I have described preferred embodiments of my novel invention, it will now be apparent that many modifications and variations may be made by those skilled in the art. I prefer, therefore, to be limited not by the specific disclosure herein but only by the appended claims.

I claim:

1. In a mechanical rectifier for energizing a D.-C. load from an A.-C. source, said mechanical rectifier comprising a commutating reactor and cooperating contacts, said commutating reactor having a main winding and a flux reversal winding; means to operate said cooperating contacts into and out of engagement; said A.-C. source, commutating reactor main winding, cooperating contacts and D.-C. load being connected in a closed series connection when said cooperating contacts are engaged; a flux reversal circuit in series with said commutating reactor flux reversal winding to supply volt seconds to said commutating reactor when said cooperating contacts are disengaged; a transductor having a main winding and control windings; said main winding connected in said flux reversal circuit; electrical means responsive to the D.-C. load current; a D.-C. source and means responsive to the D.-C. load voltage; said D.-C. load responsive electrical means, D.-C. source and load voltage responsive means connected to said auxiliary windings in a manner to vary said flux reversal current by varying the volt seconds absorbed on said transductor and maintain said load circuit at a predetermined value.

2. In a mechanical rectifier for energizing a D.-C. load from an A.-C. source; said mechanical rectifier comprising a commutating reactor and cooperating contacts, said commutating reactor having a main winding and a flux reversal winding; means to operate said cooperating contacts into and out of engagement; said A.-C. source, commutating reactor main winding, cooperating contacts and D.-C. load being connected in a closed series connection when said cooperating contacts are engaged; a flux reversal circuit in series with said commutating reactor flux reversal winding to supply volt seconds to said commutating reactor when said cooperating contacts are disengaged; a transductor having a main winding and control windings; said main winding connected in said flux reversal circuit; means to impress a first, second and third signal on said control windings to vary the volt seconds supplied for flux reversal of said commutating reactor to maintain a constant current output to said D.-C. load; said first signal responsive to the D.-C. output current, said second signal responsive to an adjustable voltage source and said third signal responsive to a stabilizing circuit to prevent oscillation in said output current.

3. In a mechanical rectifier for energizing a D.-C. load from an A.-C. source; said mechanical rectifier comprising a commutating reactor and cooperating contacts, said commutating reactor having a main winding and a flux reversal winding; means to operate said cooperating contacts into and out of engagement; said A.-C. source, commutating reactor main winding, cooperating contacts and D.-C. load being connected in a closed series connection when said cooperating contacts are engaged; a flux reversal circuit in series with said commutating reactor flux reversal winding to supply volt seconds to said commutating reactor when said cooperating contacts are disengaged; a transductor connected to said flux reversal circuit to control the volt seconds delivered to said commutating reactor to maintain a predetermined D.-C. load current; said transductor saturation made responsive to the D.-C. load current and a stabilizing system to prevent oscillation of said D.-C. load current.

4. In a rectifier for energizing a D.-C. load from an A.-C. source; said rectifier comprising a commutating reactor and cooperating contacts, said commutating reactor having a main winding and a flux reversal winding; means to operate said cooperating contacts into and out of engagement; said A.-C. source, commutating reactor main winding, cooperating contacts and D.-C. load being connected in a closed series connection when said cooperating contacts are engaged; a flux reversal circuit connected in series with said commutating reactor flux reversal winding; said flux reversal circuit supplying volt seconds to said commutating reactor when said cooperating contacts are disengaged; a transductor means; said transductor means being connected in said flux reversal circuit; said transductor means being further connected to be controlled responsive to the output voltage of said rectifier to said D.-C. load; said transductor means controlling the volt seconds supplied to said commutating reactor by said flux reversal circuit to maintain a constant predetermined D.-C. load current.

5. In a flux reversal circuit for a commutating reactor of a rectifier supplying D.-C. current to a D.-C. load; a transductor connected in said flux reversal circuit; said transductor means being further connected to be controlled responsive to the output voltage of said rectifier to said D.-C. load; said transductor means controlling the flux reversal of said commutating reactor to maintain a constant predetermined D.-C. current; said transductor comprising a first means to preadjust its saturation for a predetermined output and a second means to control its saturation in response to the D.-C. output current; said second means constructed to alter the flux reversal of the commutating reactor until said D.-C. output current is at said predetermined value; and a stabilizing circuit connected to said transductor to prevent oscillation of said output current.

6. In a flux reversal circuit for a commutating reactor of a rectifier supplying D.-C. current to a D.-C. load; a transductor connected in said flux reversal circuit; said transductor means being further connected to be controlled responsive to the output voltage of said rectifier to said D.-C. load; said transductor means controlling volt seconds supplied to said commutating reactor by said flux reversal circuit to maintain said D.-C. current at a constant predetermined value and stabilizing means to stabilize said D.-C. current responsive to the D.-C. voltage of said D.-C. load.

7. In a rectifier for energizing a D.-C. load from an A.-C. source; said rectifier comprising a commutating reactor and cooperating contacts, said commutating reactor having a main winding and a flux reversal winding; means to operate said cooperating contacts into and out of engagement; said A.-C. source, commutating reactor main winding, cooperating contacts and D.-C. load being connected in a closed series connection when said cooperating contacts are engaged; a flux reversal circuit connected in series with said commutating reactor flux reversal winding; said flux reversal circuit supplying volt seconds to said commutating reactor when said cooperating contacts are disengaged; a transductor means; said transductor means being connected in said flux reversal circuit; said transductor means being further connected to be controlled responsive to the output voltage of said rectifier to said D.-C. load; said transductor controlling the volt seconds supplied to said commutating reactor by said flux reversal circuit, said transductor means constructed to maintain a constant predetermined D.-C. load voltage.

8. In a mechanical rectifier for energizing a D.-C. load from an A.-C. source; said mechanical rectifier comprising a commutating reactor and cooperating contacts, said commutating reactor having a main winding and a flux reversal winding; means to operate said cooperating contacts into and out of engagement; said A.-C. source, commutating reactor main winding, cooperating contacts and D.-C. load being connected in a closed series connection when said cooperating contacts are engaged; a flux reversal circuit in series with said commutating reactor flux reversal winding to supply volt seconds to said commutating reactor when said cooperating contacts are disengaged; a transductor having a main winding and control windings; said main winding connected in said flux reversal circuit; means to impress a first, second and third signal on said control windings to vary the volt seconds supplied for flux reversal of said commutating reactor to maintain a constant voltage output to said D.-C. load; said first signal responsive to the D.-C. output voltage, said second signal responsive to an adjustable voltage source and said third signal responsive to a stabilizing circuit to prevent oscillation in said output voltage.

9. In a mechanical rectifier for energizing a D.-C. load from an A.-C. source; said mechanical rectifier comprising a commutating reactor and cooperating contacts, said commutating reactor having a main winding and a flux reversal winding; means to operate said cooperating contacts into and out of engagement; said A.-C. source, commutating reactor main winding, cooperating contacts and D.-C. load being connected in a closed series connection when said cooperating contacts are engaged; a flux reversal circuit in series with said commutating reactor flux reversal winding to supply volt seconds to said commutating reactor when said cooperating contacts are disengaged; a transductor having a main winding and a plurality of control windings, said main winding connected in said flux reversal circuit; means to impress a first, second and third signal on said plurality of control windings to vary the volt seconds supplied for flux reversal of said commutating reactor to maintain a constant current output to said D.-C. load; said first signal responsive to the D.-C. output current and impressed on one of said plurality of control windings, said second signal responsive to an adjustable biasing means and impressed on a second of said plurality of control windings, said third signal responsive to a stabilizing system and impressed on a third of said plurality of control windings to prevent oscillation in said output current.

10. In a mechanical rectifier for energizing a D.-C. load from an A.-C. source; said mechanical rectifier comprising a commutating reactor and cooperating contacts, said commutating reactor having a main winding and a flux reversal winding; means to operate said cooperating contacts into and out of engagement; said A.-C. source, commutating reactor main winding, cooperating contacts and D.-C. load being connected in a closed series connection when said cooperating contacts are engaged; a flux reversal circuit in series with said commutating reactor flux reversal winding to supply volt seconds to said commutating reactor when said cooperating contacts are disengaged; a transductor having a main winding and a plurality of control windings, said main winding connected in said flux reversal circuit; means to impress a first, second and third signal on said plurality of control windings to vary the volt seconds supplied for flux reversal of said commutating reactor to maintain a constant current output to said D.-C. load; said first signal responsive to the D.-C. output current and impressed on one of said plurality of control windings, said second signal responsive to an adjustable biasing means and impressed on a second of said plurality of control windings, said third signal responsive to a stabilizing system and impressed on said second of said plurality of control windings to prevent oscillation in said output current.

References Cited in the file of this patent

UNITED STATES PATENTS

| | | |
|---|---|---|
| 2,466,864 | Prati | Apr. 12, 1949 |
| 2,561,329 | Ahle | July 24, 1951 |

FOREIGN PATENTS

| | | |
|---|---|---|
| 761,249 | Germany | Aug. 2, 1954 |